INVENTOR
WILLIAM J. WEDER

BY SEMMES & SEMMES

ATTORNEY

INVENTOR
WILLIAM J. WEDER

BY SEMMES & SEMMES

ATTORNEY

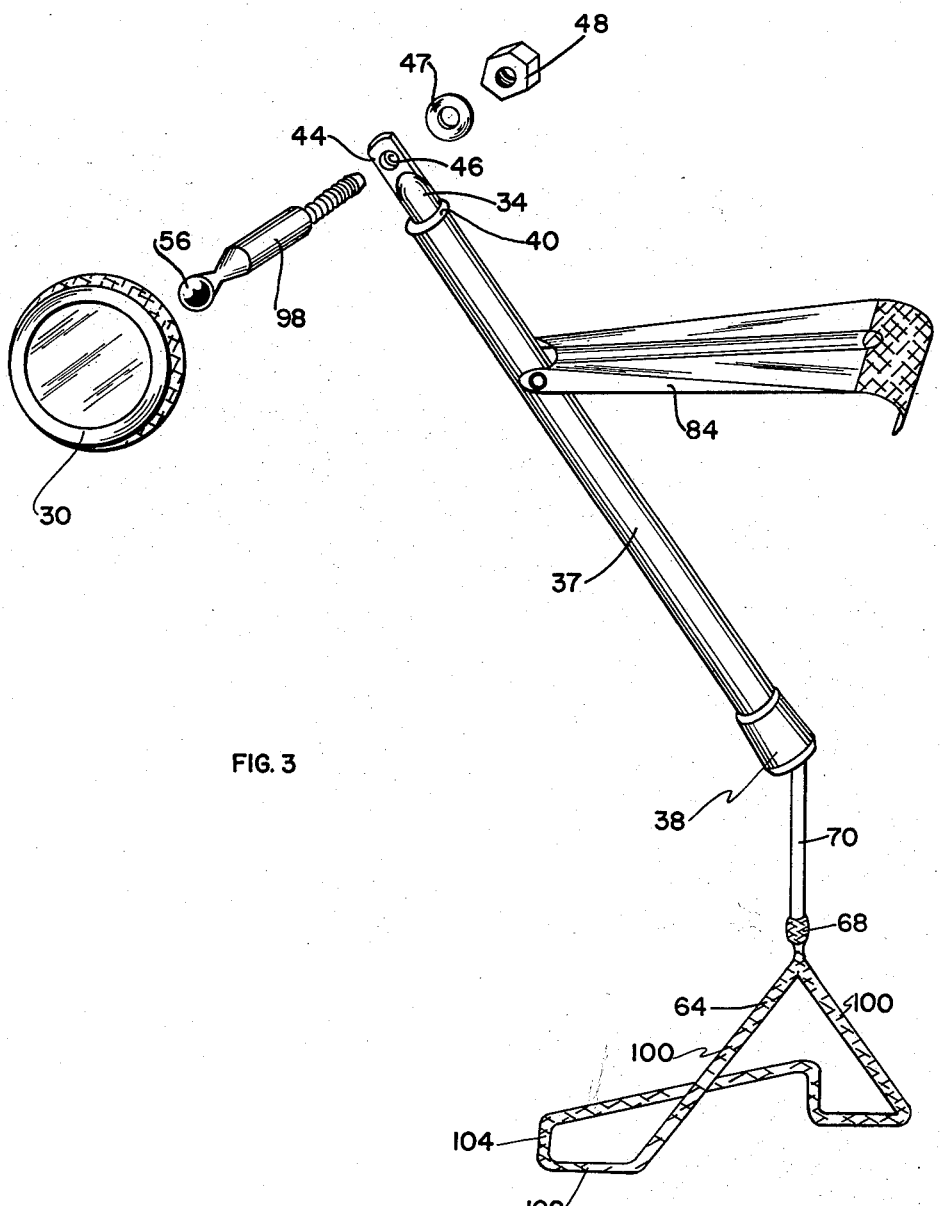

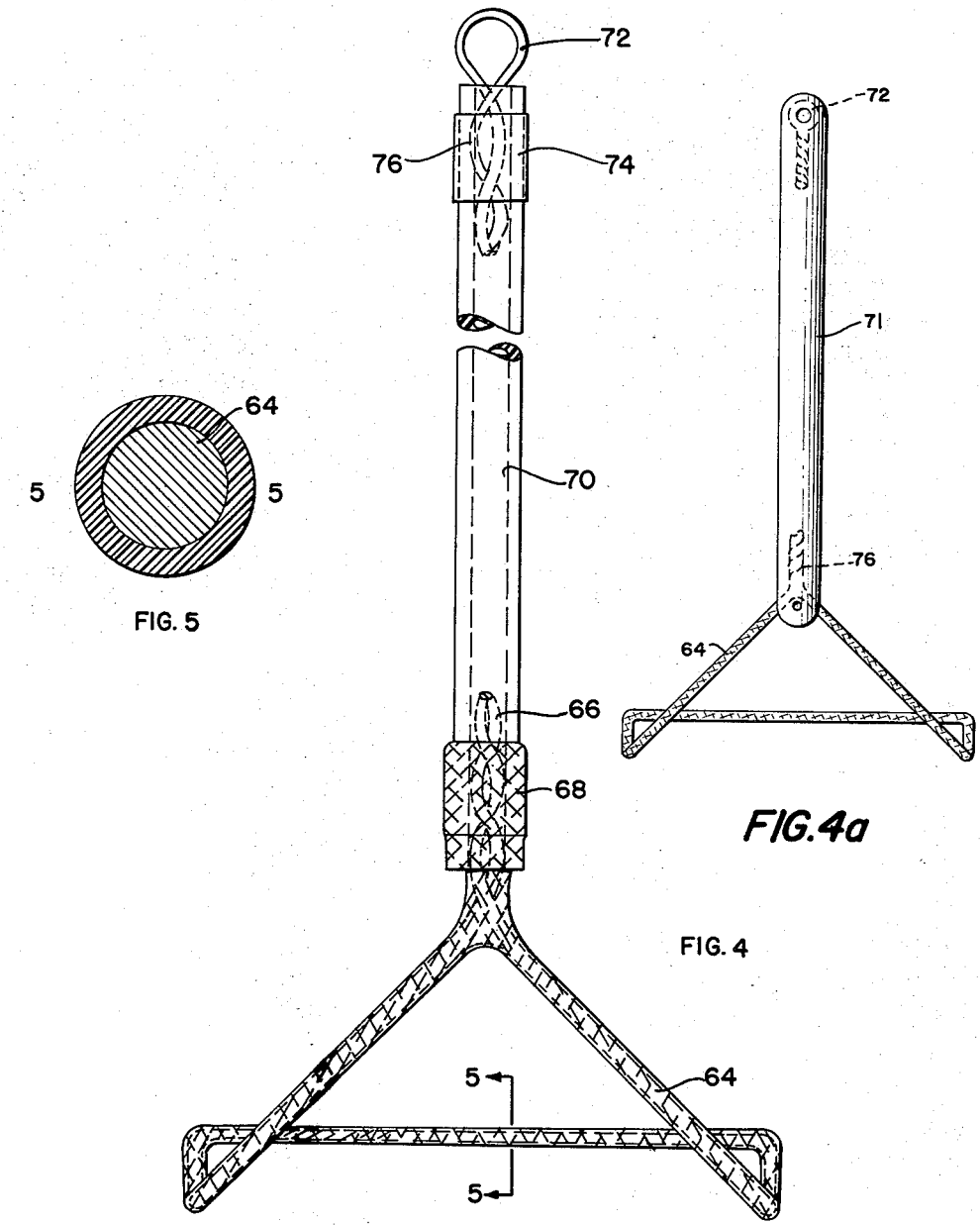

June 1, 1965   W. J. WEDER   3,186,672
REARVIEW MIRROR SUPPORT
Filed March 31, 1964   6 Sheets-Sheet 6

INVENTOR
WILLIAM J. WEDER

BY SEMMES & SEMMES

ATTORNEY

United States Patent Office

3,186,672
Patented June 1, 1965

1

3,186,672
REARVIEW MIRROR SUPPORT
William J. Weder, Upper Black Eddy, Pa., assignor to Arcoa, Inc., Portland, Oreg., a corporation of Oregon
Filed Mar. 31, 1964, Ser. No. 356,203
7 Claims. (Cl. 248—226)

The present invention relates to rearview mirrors such as are used on trucks and automobiles, particularly a rental mirror which may be readily affixed to any type vehicle.

In the trailer rental industry, such as that carried on by applicant under the service mark U-Haul (Reg. No. 746,034), a principal difficulty has been in the adaptation of rearview mirrors to the multitude of various types of automobiles with which the rental customer wishes to pull the rental trailer. Ideally, the mirror must be readily attachable by an inexperienced person to any type of vehicle and on either side thereof. Also, the mirror must be of sufficient sturdiness to withstand rough treatment at the hands of inexperienced installation and rough road conditions while complying with the requisites of the various state laws.

Numerous previous inventors have attempted to devise adjustable mirrors, but in every instance the installation has been complex and expensive. De Vaan (2,898,-070) provides three extensible arms for connection of the truck mirror to the automobile vent window. Farnsworth (3,081,057) engages the window channel or door inside by a clamp secured to tensile members 29 and provides additionally, a bumper-engagement means 41. Jones (3,118,965) teaches the concept of engaging the window channel by clamp means.

However, none have approached applicant's concept wherein the rearview mirror consists in a tubelike base having a rearview mirror pivotably supported therein, a top auto window channel clamp pivoted at one end to said base and at its free end engageable with the auto window channel and a bottom auto door clamp flexibly depending from the base. These combined features point literally to a ten second rigid installation of the mirror on either side of any size or type vehicle by any inexperienced person and without tools of any kind.

Accordingly, it is an object of invention to provide a readily installed rearview mirror adapted for ready installation in any type or size vehicle.

Another object of invention is to provide a universally adaptable mirror for the trailer rental industry.

Yet, an additional object of invention is to provide means for adjustably supporting a rearview mirror on the door of a truck or automobile.

Yet, additional objects of invention will become apparent from the ensuing specification and attached drawings wherein:

FIG. 3 is an exploded view of the rental mirror, the rearview mirror itself being of a modified circular construction.

FIG. 4 is a front elevation of the bottom auto door clamp 64 attached to a flexible neoprene tube 70 having a hook 72 fixed at its top.

FIG. 4–A is a front elevation showing a modification of invention wherein a molded shock cord 71 entirely encompasses and extends wire form.

FIG. 5 is a sectional view taken along section line 5—5

2 of FIG. 4 and showing a polyvinyl chloride coating provided for wire clamp 64.

Figures 6, 7:
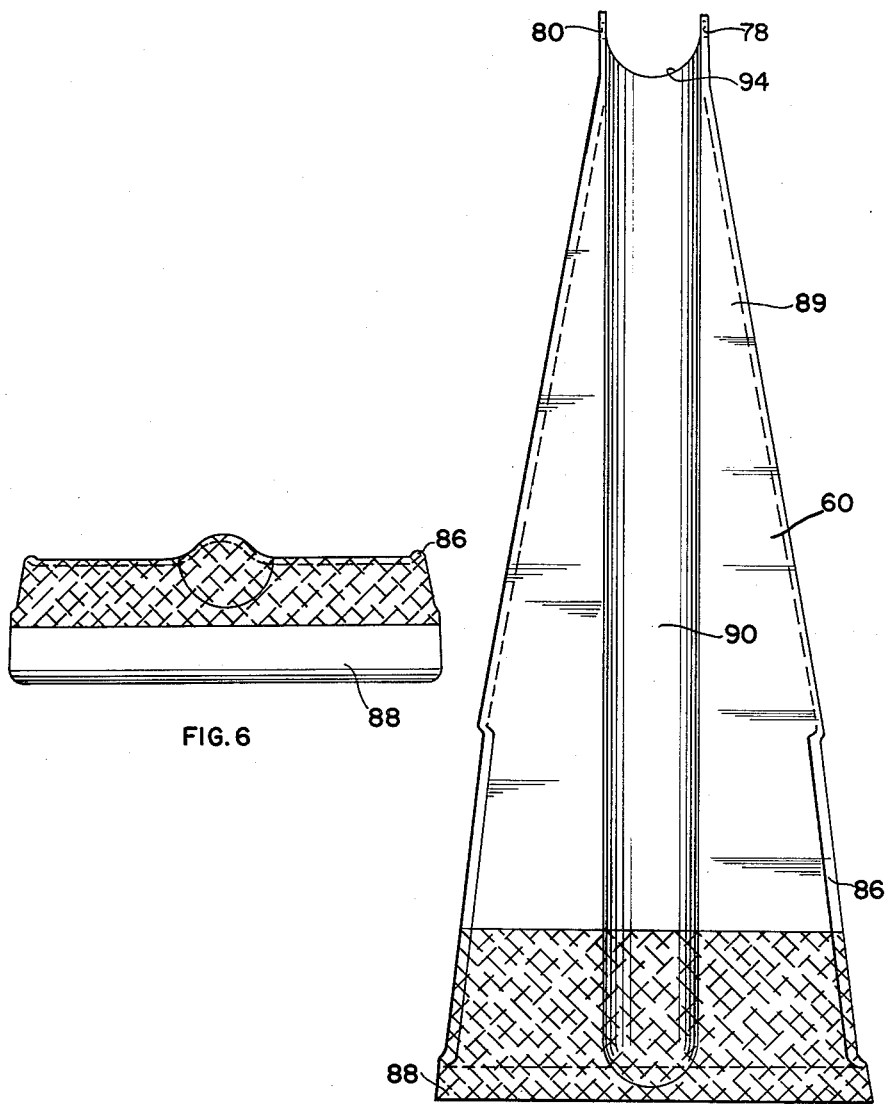

FIG. 6 is a front elevation of the top of the auto window channel clamp showing channel-engaging, downwardly inclined hook 88.

FIG. 7 is a top plan of the top auto window channel clamp convexly configured in its median portion to engage the tubelike base 32.

Figure 8:
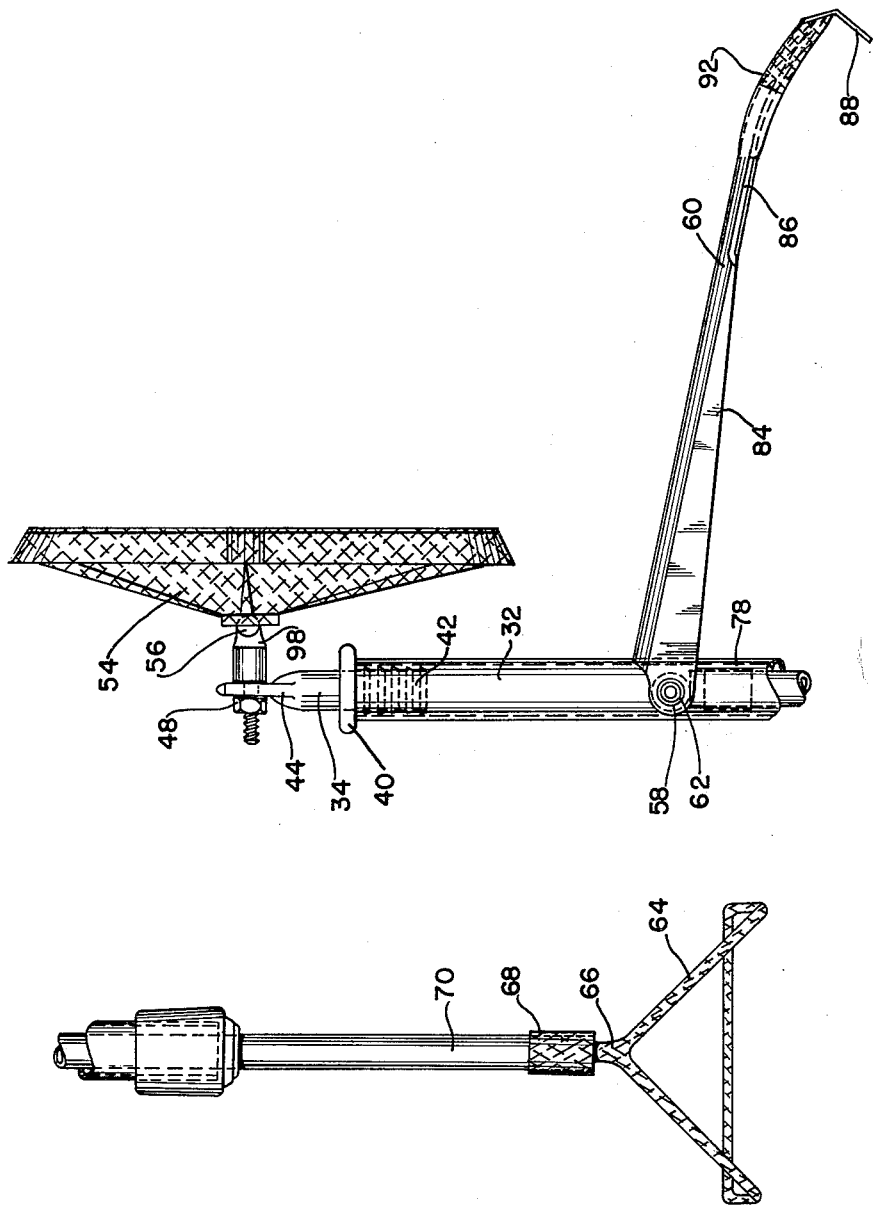

FIG. 8 is fragmented front elevation of the entire device.

Figure 1:
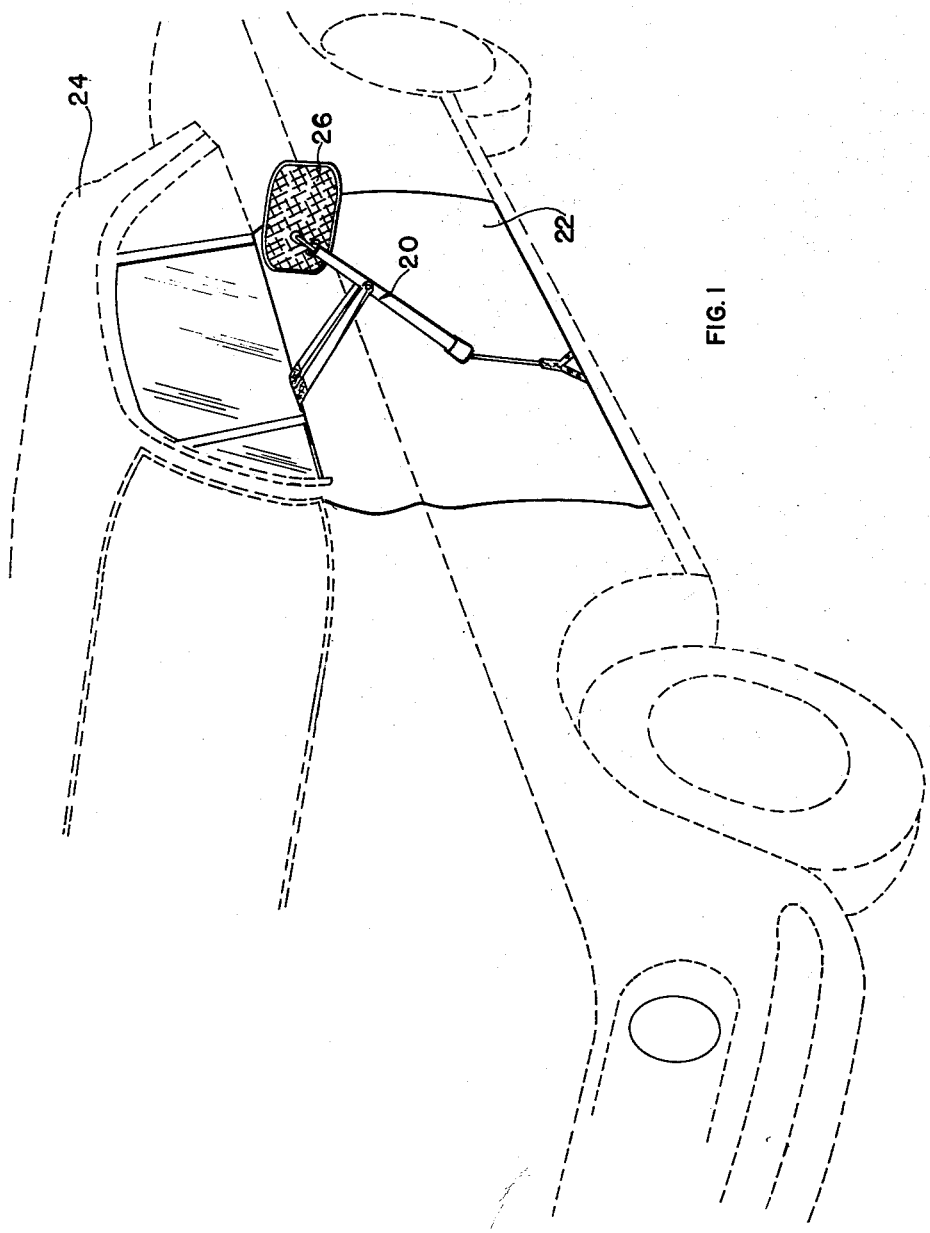
FIG. 1 is a perspective view (with an auto shown in phantom) of the rearview mirror installed on the auto door by means of its top auto window clamp engaging the auto window channel and the flexibly depending bottom auto door clamp engaging auto door bottom.
Figure 2:
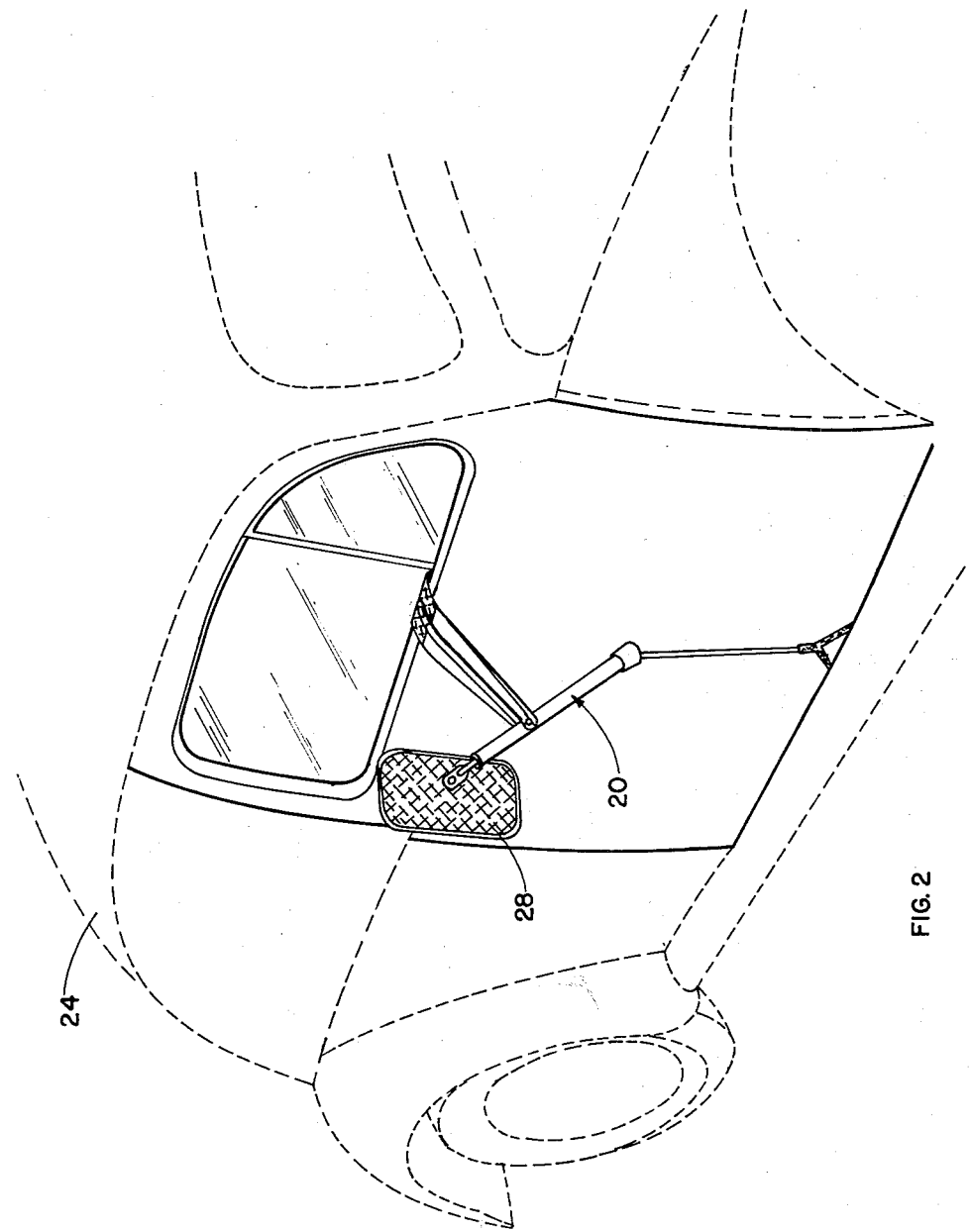
FIG. 2 is a similar perspective showing the mirror installed on the righthand side of the vehicle.

In FIGS. 1, 2 and 8, a rental mirror generally designated 20 is shown as attached to an auto (shown in phantom) having door 22 and auto top 24. In FIG. 1 rectangular mirror 26 is shown in its horizontal offset supported position. In FIG. 2 a somewhat similar rectangular mirror is shown in its vertical support position. Manifestly a round or circular mirror 30, as illustrated in FIG. 3, may also be employed. However, the offset rectangular mirror is preferred for its extraordinary capabilities for viewing throughout the length of a towed vehicle. In vertical position, of course, the rectangular mirror is less subject to damage and provides a full view of the towed vehicle.

Mirror support 20 comprises a primary aluminum tubelike base 32 and a secondary mirror support piece 34, pivotably supported within tube 32 by means of a neoprene friction cup 36, having inner annular ridges 42, a circular flange 40 for engaging the top of the tubelike base 42. At the bottom of tubelike base 32, a rubber, neoprene or like resilient cushion or bumper 38 is provided.

Mirror support piece 34 has, as illustrated in FIGS. 3 and 8, a flattened portion 44 with an aperture 46 extending therethrough. A special mirror support piece 98 having a ball 56 at one end and a threaded portion extensible through aperture 46 at the other, may be secured to mirror support piece 44 by means of washer 47 and nut 48. Ball 56 is fitted within a corresponding socket support in mirror box 54.

A roll pin 58 traverses primary member 32 at its midportion and extends on either side thereof through top auto window channel clamp arm shoulder flanges 78 and 80. A roll pin bushing 62 may be employed for securing the shoulder flanges to roll pin 58. Alternatively, both flanges 78 and 80, as well as roll pin bushing 62 may be formed on a die-produced extrusion from the parent metal of clamp 60. As illustrated in FIGS. 3 and 4, bottom auto door clamp 64 may be vinyl coated so as to avoid scratching the auto door and consists of inverted hook portion attached to flexible neoprene hollow tubing 70 by means of V-shaped door outside portion 100, inwardly projecting horizontal portion 102 for engaging the door bottom and an upwardly projecting door inside portion 104 parallel to said inverted V-shaped door outside portion 100 and defining the inner edge of the door engaging clamp. Tubing 70 in turn is secured, as illustrated in FIG. 4, about roll pin 58 by means of shock cord bushing 76 fastened about twisted wire 74 which in turn defines wire lock portion 72.

As illustrated in FIGS. 6, 7 and 8, top auto window channel clamp 60 includes downturned side portions 84 and outward slightly upturned portions 86. Inwardly inclined window channel hook portion 88 of approximately similar width as bottom outer door hook portion 104 is provided for grasping the auto channel window. As illustrated in FIG. 7 clamp 60 may be provided with median ridge 90 for complementally engaging the tubelike base 32 when it is in folded position. Shoulders 78 and 80 define a semi-circular saddle 94 for pivotally engaging the tubelike base 32 when arm 60 is pivoted outwardly in mirror support position.

In one modification of invention, auto-window-channel engaging hook 88 and portional hook 104 being of equal dimension were approximately 4½ inches in width, tubelike base 32 was approximately 17 inches in length and flexible neoprene tubing 70 including depending hook 64 was also 17 inches in length. The entire assembly from mirror support piece 34 to bottom auto door hook 64 was extensible to approximately four feet.

As will be readily apparent, the present rental mirror is adaptable to all types of automobiles and most trucks. The aluminum base 32 and clamps 60 are non-rusting and exceptionally light, the heaviest portion of the device being the glass in the mirror itself. The rental mirror may be readily installed on either side of a car or truck and the flexible rental mirror is secure and not subject to vibration looseness, does not damage the car finish when installed, and does not have to be reassembled for installation on either right or lefthand side door. Any rental customer may install the mirror anywhere without tools and without instruction. Manifestly, variations in size and materials used may be employed without departing from the spirit and scope of invention, as defined in the appended claims.

I claim:
1. A rearview mirror comprising:
 (a) a supporting base, having bumper means at its lower end;
 (b) a mirror supporting piece extending from within said base and adjustably contained therein;
 (c) a rearview mirror attached to said supporting piece;
 (d) a top auto window channel clamp pivoted at one end medially of said base and extending to one side thereof; and
 (e) a bottom auto door clamp flexibly depending from the bottom of said base.
2. A rearview mirror comprising:
 (a) a tubelike base, having bumper means at its lower end;
 (b) a mirror support extending from and rotatably supported within said base;
 (c) a rearview mirror pivoted upon said mirror support;
 (d) a top auto window channel clamp pivoted at one end about a medial portion of said base; and
 (e) a bottom auto-door engaging clamp flexibly connected to said base so as to be extensible therefrom.
3. A rearview mirror as in claim 2, said top auto window channel clamp being pivoted about said tubelike base by pin means extending through said tube and the pivoted end of said clamp.
4. A rearview mirror as in claim 3, including an extensible connector fastened about said pin at one end and fastened to said bottom door engaging clamp at its other end.
5. A rearview mirror as in claim 2, said top auto window clamp having:
 (i) in top plan an outwardly widening configuration at its free end inner shoulders defining at its pivoted end a semi-circular saddle for engagement with said base;
 (ii) an inwardly and downwardly depending auto window channel clamp at its free end; and
 (iii) a median concavity in the top of said clamp for receiving said base when said auto window channel clamp is folded downwardly against said base in inoperable position; said concavity extending from said saddle to said auto window clamp free end.
6. An auto mirror as in claim 5, said bottom auto-door engaging clamp including an inverted V-shaped outside portion, an inwardly projecting horizontal portion for engaging the door bottom, and an upwardly projecting inside portion parallel to said inverted V-shaped outside portion and defining the inner edge of the door engaging clamp.
7. A rearview mirror as in claim 6, said bottom auto door engaging clamp and said top auto window clamp being of substantially identical width.

References Cited by the Examiner
UNITED STATES PATENTS

| | | | |
|---|---|---|---|
| 2,458,117 | 1/49 | Tolbert | 248—279 |
| 2,518,538 | 8/50 | Giblin | 248—226 X |
| 2,545,777 | 3/51 | Hardin | 248—279 |
| 2,673,705 | 3/54 | Buckley | 248—317 |
| 2,903,221 | 9/59 | Landis | 248—154 |
| 2,938,696 | 5/60 | Hinshaw | 248—215 |
| 3,114,530 | 12/63 | Shilling | 248—226 |

CLAUDE A. LE ROY, *Primary Examiner.*